United States Patent

Morin et al.

[11] Patent Number: 5,945,199
[45] Date of Patent: Aug. 31, 1999

[54] PANE FOR VEHICLE, AND POLYMERIC MATERIAL SHEET USED IN THIS PANE

[75] Inventors: Claude Morin, Puteaux; Jean-Louis Bravet, Thourotte, both of France

[73] Assignees: Saint-Gobain Vitrage, Courbevoie, France; Asahi Glass Company, Ltd., Tokyo, Japan

[21] Appl. No.: 08/407,954

[22] Filed: Mar. 22, 1995

[30] Foreign Application Priority Data

Mar. 22, 1994 [FR] France ..................................... 94 03330

[51] Int. Cl.⁶ .............................. B32B 3/00; G02B 27/14
[52] U.S. Cl. ......................... 428/156; 428/172; 428/213; 428/423.3; 428/425.6; 345/7; 359/630
[58] Field of Search .................. 428/156, 172, 428/192, 213, 423.3, 425.6; 359/630; 345/7

[56] References Cited

U.S. PATENT DOCUMENTS

| | | | |
|---|---|---|---|
| T739,939 | 4/1969 | Christensen | 350/319 |
| 2,750,833 | 6/1956 | Gross | 88/2.3 |
| 3,762,988 | 10/1973 | Clock et al. | 161/183 |
| 3,881,043 | 4/1975 | Rieger et al. | 428/81 |
| 4,316,868 | 2/1982 | Esposito et al. | 425/462 |
| 4,787,711 | 11/1988 | Suzuki et al. | 350/174 |
| 4,892,386 | 1/1990 | Suzuki et al. | 350/174 |
| 5,013,134 | 5/1991 | Smith | 350/174 |
| 5,087,502 | 2/1992 | Esposito et al. | 428/156 |
| 5,130,174 | 7/1992 | Esposito | 428/156 |
| 5,500,274 | 3/1996 | Francis et al. | 428/156 |
| 5,639,538 | 6/1997 | Wong | 428/156 |

FOREIGN PATENT DOCUMENTS

| | | |
|---|---|---|
| 0 038 760 | 10/1981 | European Pat. Off. . |
| 0 131 483 | 1/1985 | European Pat. Off. . |
| 0 132 198 | 1/1985 | European Pat. Off. . |
| 0 190 517 | 8/1986 | European Pat. Off. . |
| 0 389 354 | 9/1990 | European Pat. Off. . |
| 0 420 228 | 4/1991 | European Pat. Off. . |
| 91/06031 | 5/1991 | European Pat. Off. . |
| 2 347 170 | 11/1977 | France . |
| 2 680 584 | 2/1993 | France . |
| 2680584 | 2/1993 | France . |
| 26 29 779 | 1/1978 | Germany . |
| WO 91/06031 | 5/1991 | WIPO . |
| WO93/05946 | 4/1993 | WIPO . |

OTHER PUBLICATIONS

Patent Abstracts of Japan, vol. 11, No. 141 (C–421), May 8, 1987, JP–61–281118, Dec. 11, 1986.
Database WPI, Derwent Publications, AN–86–249110, JP–61–177241, Aug. 8, 1986.

*Primary Examiner*—Donald Loney
*Attorney, Agent, or Firm*—Oblon, Spivak, McClelland, Maier & Neustadt, P.C.

[57] ABSTRACT

A pane formed of a substrate and a film of polymeric material. The film of polymeric material has a thickness that varies in at least one predetermined zone of the pane, with the result that the external faces of the pane are not parallel to each other in this zone. The pane is useful in an eye-level display system for the purpose of eliminating a double reflection image.

8 Claims, 2 Drawing Sheets

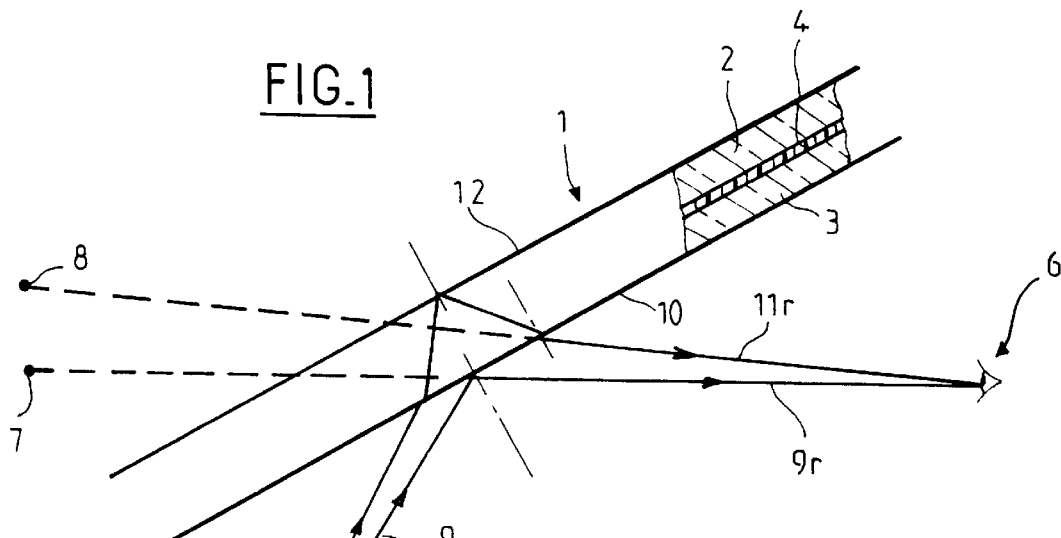
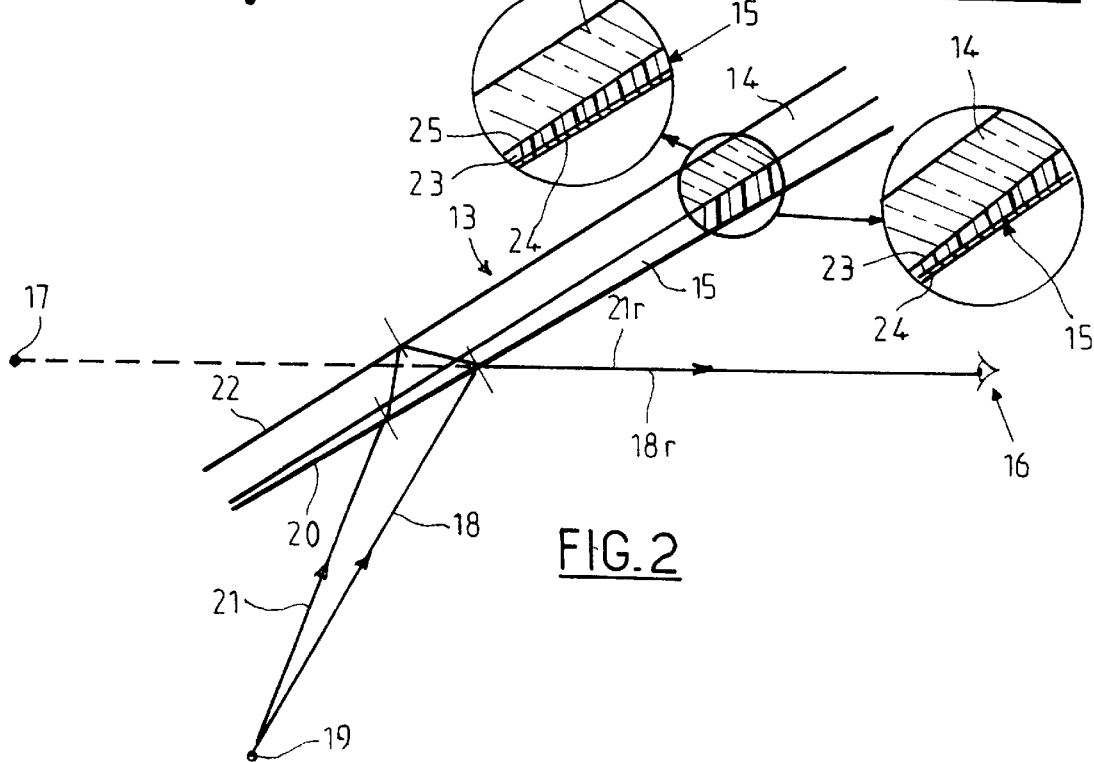

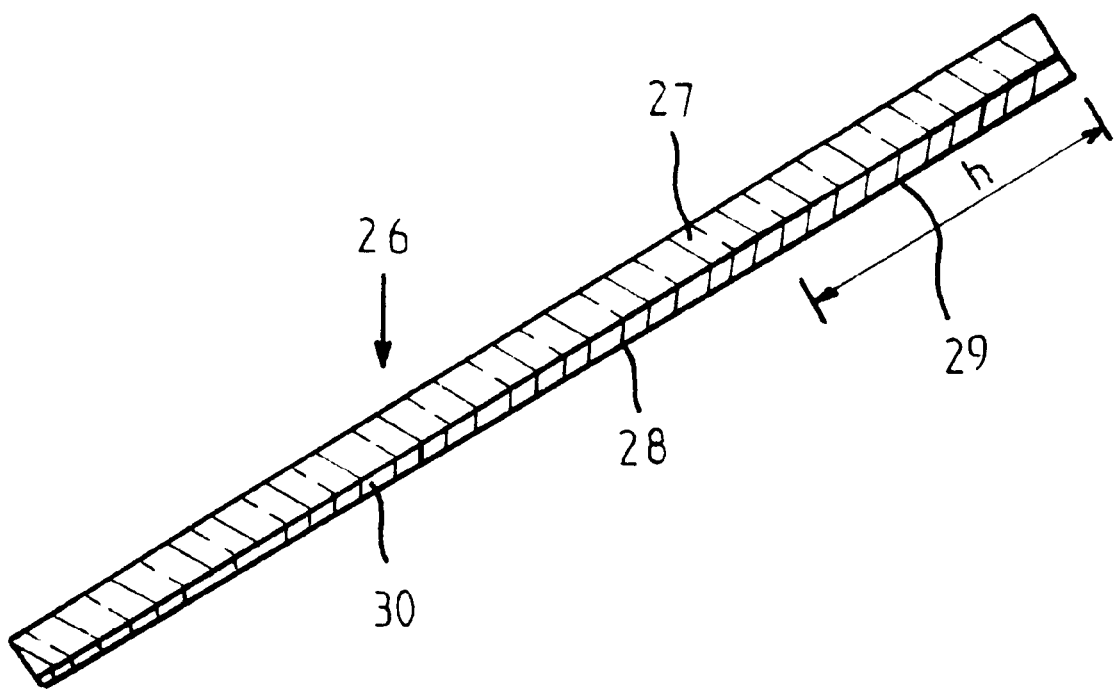
FIG_3

PANE FOR VEHICLE, AND POLYMERIC MATERIAL SHEET USED IN THIS PANE

SUMMARY OF THE INVENTION

The present invention concerns a pane for vehicles, preferably a high optical quality pane capable of being mounted at a high inclination to the vertical and, more preferably, a pane making possible the display of information by images projected onto the pane, which appear to be located in front of the vehicle.

BACKGROUND OF THE INVENTION

Information display systems projected onto a pane which are reflected towards the driver or observer are known. These systems, also termed eye-level display systems, allow the driver of the vehicle to be informed, for example, of the speed of the vehicle without the driver having to look away from the field of view in front of the vehicle, and thus lead to an improvement in safety.

However, when an information item is projected onto a windscreen having a laminated structure composed of two glass sheets and an intermediate sheet of polymeric material, a double image is observed: a first image reflected by the surface of the windscreen facing the interior of the passenger compartment and a second image reflected from the external surface of the windscreen, these two images being slightly offset from one another. This offsetting can interfere with viewing the information.

To overcome this disadvantage there has been proposed, as described in U.S. Pat. No. 5,013,134, an eye-level display system using a laminated windscreen composed of two glass sheets and an intermediate layer of polyvinyl butyral (PVB), the two external faces of which are not parallel but are in a wedge-shape, with the result that the image projected by a display source and reflected by the face of the windscreen nearest the passenger compartment is virtually superimposed upon the same image originating from the same source reflected by the face of the windscreen towards the outside.

To construct this laminated pane having a wedge shape, an intermediate sheet having its thickness decreasing from the upper edge of the pane towards the lower edge is used. This solution, although satisfactory in terms of eliminating the double image, nevertheless has other disadvantages. In particular, the assembling of the laminated pane requires more stringent precautions, notably during its passage through a calenderer, because of the non-parallel faces of the two glass sheets. Furthermore, and in particular, the PVB can lose its initial thickness profile by flow or creep during assembly under pressure and heat which leads to poor results since the value and the uniformity of the decrease in the profile in the reflection zone are essential to this particular solution of the problem. Furthermore, with a laminated structure comprising two glass sheets it is not possible to create panes having a wedge shape over only a portion of their height, unless the face of the glass sheet towards the vehicle interior is machined, which is very difficult to carry out and almost impossible in the case of a curved glass sheet. The present invention eliminates the aforementioned disadvantages.

DESCRIPTION OF THE INVENTION

The present invention provides a pane comprising a monolithic or laminated substrate of glass and/or of polymeric material and a film of polymeric material covering the surface of the substrate, this film having a thickness that varies at least in a predetermined zone (i.e, in at least one area) of the pane in such a way that the outer surfaces of the pane are not parallel in this zone. In one embodiment of the invention pane, the film of polymeric material having a variable thickness over at least one zone covers the entire area of the substrate or a majority thereof. The asymmetric pane according to this invention may be used with advantage in any application as a solution to the problem of a double image for an observer (e.g., situated inside a passenger compartment) where the double image results from the reflection of a light ray from both faces of a pane, whether this ray originates from an object situated through the pane or this ray is initially projected onto the face thereof from, e.g., above or below and towards the observer (e.g., towards the interior of a vehicle), that is to say, e.g., onto the face of the film of polymeric material.

When the invention pane is intended for receiving a projected item of information as described above, the predetermined zone corresponds to at least the projection zone of the information. In this case the transparent film of polymeric material has a uniform decrease in thickness from the top downwards at least in the predetermined zone, when the pane is inclined in an automobile the conventional sense.

In one embodiment of the pane according to this invention, the film of polymeric material has a thickness that varies throughout the height of the pane and notably, a thickness that decreases uniformly at a constant slope from the upper edge of the pane to the lower edge. In another embodiment of the pane according to this invention, the film of polymeric material has a constant thickness over at least a portion of the height of the pane and a thickness that decreases with constant slope in a downward direction over the predetermined part(s), this generally being the median and/or lower part of the pane.

The term film of polymeric material as used herein is to be understood as meaning, according to this invention, either a sheet comprising one or more layers or one or more films, this sheet, which is also one of the subjects of the invention, being optionally produced in advance and assembled to the substrate, or one or more layers fabricated directly on the substrate by sputtering and/or injection by means of a mold. At least one of these layers or at least one of these films has a thickness that varies within the predetermined zone of the pane. The superimposed layers may be of different types. In a pane for vehicles, the film of polymeric material according to this invention is preferably the external film facing towards the passenger compartment.

In a preferred embodiment of the invention, the film of varying thickness is a polyurethane film. When the layer of polymeric material is formed of several films, for example two polyurethane films, one polyurethane film having, for example, properties of energy-absorption, impact resistance and penetration resistance, and one film termed a surface film having properties of resistance to abrasion and scratching, the variation in thickness according to the invention can be produced on the film having energy-absorber-properties or on the surface film, according to the respective thicknesses of the different films and according to the desired variations in thickness. The variation in thickness is preferably produced in the film having the larger mean thickness.

For substantially reducing or eliminating the double image, notably the double reflection image, by the use of a wedge-shaped pane, generally a decrease in thickness of the film of polymeric material with a slope of 0.1 to 0.4 mm per meter is satisfactory including all values and all ranges therebetween. This value varies for a given position of the observer with reference to the image source and with reference to the virtual image, notably as described for example in U.S. Pat. No. 5,013,134 already referred to above and incorporated herein by reference, upon the angle of inclination of the pane in the vehicle, upon the thickness of the pane, upon the angle of incidence of the projected image and also upon the curvature of the pane.

In a preferred embodiment of this invention, the sheet of polymeric material is a preshaped sheet containing a polyurethane layer of varying thickness. A polyurethane film having the desired thickness may advantageously be produced by casting the reaction components suitable for forming the film by means of a die or a scraper casting head as described, for instance, in Patent FR-A-2 347 170, incorporated herein by reference, acting on the height of the scraper with respect to the casting support, or again by acting on the dimensions of the casting slit, or again, if applicable, by using a casting support having a transverse slope and utilizing gravity on the cast film while it is still not yet fixed.

Thus, it is possible to form a first film of uniform thickness, for example a polyurethane film having surface properties, by casting the reaction components onto a support formed of a continuous band of glass or of tensioned, flexible polymeric material, for example of polyethyleneterephthalate, then to form, on this first film, the second film of polyurethane having energy-absorber properties, with a thickness that decreases in one direction, preferably the direction of the width in a windshield, and at a constant slope, for example of the order of 0.2 to 0.3 mm per meter of width including all values therebetween and all ranges therebetween. Suitable polyurethanes for producing these films, at least one of which has a decreasing thickness for an application in a wedge-shaped pane according to this invention, are for example those described in Patent Publications FR-A-2 480 669, FR-A-2 546 810, FR-A-2 398 606, EP-A-0 132 198, EP-A-0 389 354, EP-A-0 190 157, JP-A-86 177 241 and JF-A-86 281 118, all of which are incorporated herein by reference.

One of the advantages of using a sheet of polymeric material based upon polyurethane, as described above, is that it is not subject to flow during assembling with the glass substrate. This means that the decrease in thickness produced during the production of the polyurethane film is maintained after its assembly with the glass.

The assembling of the sheet of polymeric material comprising one or two or more polyurethane films with the substrate, notably with a glass sheet, can be carried out by direct assembling of, e.g., a film having energy-absorber properties with a glass substrate or with the help of a supplementary adhesive film, for example an adhesive of thermoplastic polyurethane having a thickness of between 2 and 20 μm, for example.

Another advantage of the wedge-section pane according to this invention which uses a polymeric material sheet as external film facing towards the passenger compartment is that it allows, if applicable, a more complex thickness profile than prior art wedge-section laminated panes. In fact, it is much easier to modify in the desired manner the thickness of the plastics material sheet than the thickness of a glass sheet. Thus, it is possible to produce a pane which can have zones of constant thickness and zones of variable thickness distributed through the height, width, etc. of the pane.

Another advantage of the wedge-section pane according to the present invention, in its variant that uses as substrate a single glass sheet, is that it can be thinner than known wedge-section laminated panes. The decrease in thickness of the pane from one edge to the other through its height can then be smaller than in a laminated pane of wedge-section for solving the problem of the double image. In fact, the thicker the pane, the larger must be the portion having decreasing thickness for this problem to be solved. In addition, a pane having a monolithic substrate according to this invention has a better optical quality, notably at a high inclination, than a wedge-section laminated pane.

BRIEF DESCRIPTION OF THE DRAWINGS

Other advantages and characteristics of the invention will become apparent from the remainder of the description, prepared with reference to the figures and examples.

FIG. 1 shows schematically a known eye-level display system using, as reflection support, an automobile pane having parallel faces.

FIG. 2 shows schematically an eye-level display system using, as reflection support, a wedge-section pane according to this invention.

The partial FIGS. 2a and 2b show embodiments of the wedge-section pane of FIG. 2.

FIG. 3 shows schematically a variant of the invention using a sheet of polymeric material, the thickness of which varies over a portion of the height of the pane.

The figures are schematic and, of course, the dimensions and the ratios between these dimensions do not correspond to the real dimensions and ratios.

The display system of the state of the art shown in FIG. 1 uses a laminated windscreen 1 formed of two glass sheets 2, 3 and of one intermediate sheet 4 of polyvinyl butyral. The image source 5 projected onto the windscreen is viewed by the observer 6, situated inside the passenger space of the vehicle, in the form of a principal image 7 and in the form of an offset secondary image 8. The principal image 7 is due to the reflection 9r of the light ray 9 emitted by the image source 5 from the face 10 towards the interior of the vehicle, whereas the secondary image 8 is due to the reflection 11r of the light ray 11 emitted by the image source 5 from the face 12 which is towards the outside of the vehicle. The image seen by the observer inside the vehicle is thus broken down into a principal image 7 and a secondary image 8.

In the system shown in FIG. 2, the wedge-section pane 13 is composed of a glass sheet 14 of thickness between 2 and 5 mm, for example and of a sheet of polymeric material 15, the thickness of which decreases uniformly from a determined value starting from the top of the pane downwards. The observer 16, situated as before, now sees only a single virtual image 17. In fact, the reflection 18r of the light ray 18 emitted by the image source 19 from the outer face 20 of the sheet of plastics material facing towards the interior of the vehicle produces the same virtual image 17 as the reflection 21r of the light ray 21 emitted by the image source 19 from the outer face 22 of the glass sheet 14.

The sheet of polymeric material 15 associated with the glass sheet 14 is, according to an embodiment such as that shown in FIG. 2a, formed of two polyurethane layers: a layer 23 having energy-absorber and adhesive properties, of average thickness between 0.3 and 2 mm for example, in contact with the glass sheet, this layer 23 having a thickness that decreases at constant slope over a portion or over the entire height of the pane downwards, and a surface film 24 of uniform thickness of between 0.05 and 1 mm for example. The gradient of the decrease is of the order of 0.1 to 0.4 mm per meter, for instance.

The embodiment shown in FIG. 2b uses a sheet of polymeric material 15 formed of two polymeric films 23 and, in addition, a thermoplastic polyurethane adhesive film 25 having a thickness between 2 and 20 μm, for example. The plastics material sheet 15 will be described in greater detail below.

In FIG. 3, the pane 26 intended for eliminating double reflection is formed of a glass sheet 27 and of a polymeric material sheet 28, which has a uniform thickness in the upper part 29 of the pane over a height h which corresponds, for example, to ⅓ of the total height, and a decreasing thickness in the median and lower part 30 of the pane, this part being intended for the display of information.

EXAMPLE

For the production of the pane shown in FIG. 2b, the procedure used may be as follows:

Generally, a sheet of polymeric material approximately one meter wide is produced, comprising three layers of polyurethane intended to be assembled with a monolithic glass substrate. The three polyurethane layers are, respectively, a surface layer based upon a thermosetting polyurethane of constant thickness, a layer having energy-absorber properties based upon a polyurethane of thermoplastic character and of decreasing thickness, and a third layer, which is an adhesive layer based upon a thermoplastic polyurethane of constant thickness.

In more detail, onto a continuous support of glass or a tensioned, flexible polymeric material such as a polyethylene terephthalate film a reaction mixture of an isocyanate component comprising a hexamethylene-diisocyanate trimer and a polyol component comprising a trifunctional poly (ε-caprolactone) polyol was cast. The thickness of the film was approximately 100 um.

On this first layer there was formed a second layer, having energy-absorber properties by casting a reaction mixture of a polyol component comprising at least one polyol having a molecular weight between 400 and 4,000, at least one short diol of molecular weight less than 300, for example 1,4-butane diol, and in a proportion of approximately 10 parts by weight of the polyol component, a polycaprolactone triol, and of an isocyanate component comprising bis (4-isocyanatocyclohexyl) methane. A scraper casting head or a die was used for casting of the curtain type by regulating the casting head or the die so as to obtain a thickness of 1.05 mm at one side of the layer, which decreases uniformly with a constant gradient of 0.23 mm per meter to a thickness of 0.81 mm at the other side.

Onto this wedge-section layer having energy-absorber properties there is brought a film of thermoplastic polyurethane of 5 μm thickness obtained from a solution of a polyurethane resin, itself obtained from a polyol component comprising poly (ε-caprolactone) polyol of molecular weight between 1,000 and 2,000 and having a functionality of 2, and 1,4-butane diol, and of an isocyanate component comprising a mixture of bis (4-isocyanatocyclohexyl) methane and of 3-isocyanatomethyl-3,5,5-trimethylcyclohexyl isocyanate.

The sheet of polymeric material thus produced is assembled with a glass sheet of 3.1 mm thickness by disposing the polymeric material sheet with its thicker part at the top of the pane and its thinner part at the bottom, to form an asymmetric wedge-section laminated pane which can be used, notably, as a safety windscreen permitting the display of data in an automobile vehicle. The assembling can be carried out in two steps, a first step consisting of a preliminary assembling obtained by passage of the constituent elements of the pane through a calenderer or, in a variant, through a vacuum assembling device, and a second step consisting of an autoclave cycle, during which the pane is subjected for 30 minutes to a pressure of approximately 8 bars at a temperature of approximately 140° C. During these assembling operations, the profile of the thickness of the plastics material sheet is not affected.

The pane produced, used as a vehicle windscreen, mounted at a slope of 28° to the horizontal, enables the double reflection image of an image source projected onto this windscreen to be eliminated. As a comparison, this double image was projected from the same source onto a laminated windscreen of wedge-section as described in U.S. Pat. No. 5,013,134, the mean thickness of which is 3.6 mm, mounted in the same conditions, which required a decrease in thickness for the intermediate PVB sheet of 0.31 mm per meter.

By comparison with a known wedge-section laminated windscreen, the pane according to this invention therefore has many advantages. It allows a lower gradient of decrease, which is easier to obtain. By offering a face of polymeric material (that formed by the polymeric material film of variable thickness), it offers many more possibilities in the variations of thickness. The pane according to this invention may be a plane or, more generally, a curved pane, to enable it to be used an a windscreen for a vehicle. The desired decrease for the film of polymeric material may of course vary according to the curvature of the pane. The substrate is generally composed of a glass sheet which may be of annealed glass, of thermally or chemically toughened glass, or of semi-toughened glass. The present invention also concerns an eye-level display comprising a pane of two layers: a monolithic or laminated substrate and a layer of plastics material, the varying thickness profile of which is intended, notably, for eliminating the double reflection image. Most preferably, the image appears as a unitary whole with no double image. However, 85%, 90%, 95%, 96%, 97%, 98%, 99% and 100% and all values therebetween and all ranges therebetween of double image elimination can be provided by the invention, completely non-superimposed images having 0% elimination. This application is based on France 94 03 330 filed Mar. 22, 1994, incorporated herein by reference.

What is claimed as new and desired to be secured by Letters Patent of the United States:

1. A pane, comprising:
   a glass sheet and a sheet of transparent polymeric material covering at least a portion of said glass sheet, and wherein said sheet of transparent polymeric material has a wedge-shaped profile in a zone of said pane,
   wherein said sheet of transparent polymeric material comprises at least two polyurethane layers,
   and wherein one of the polyurethane layers is a thermoplastic polyurethane layer (2) having energy-absorber properties and a decreasing thickness in said zone of said pane,
   and wherein the polyurethane layer (2) is adjacent a thermosetting polyurethane surface layer (3),
   and wherein said layer (3) is uncovered,
   and wherein the external surfaces of said pane are not parallel to each other in said zone.

2. The pane according to claim 1, wherein the sheet of polymeric material covers essentially the entire surface of the glass sheet.

3. The pane according to claim 1, wherein the zone covers the entire pane, the film thickness decreasing uniformly at a constant gradient from an upper edge to a lower edge of the pane.

4. The pane according to claim 1, wherein the zone is the median and lower part of the pane.

5. The pane according to claim 1, wherein said pane attenuates or entirely eliminates a double image due to reflection from the pane.

6. A display system wherein information is reflected from a pane, said pane being the pane of claim 1.

7. The pane according to claim 1, wherein the gradient of decrease in said zone is between 0.1 and 0.4 mm per meter.

8. The pane of claim 1, wherein said sheet of transparent polymeric material comprises three polyurethane layers,
   and wherein the polyurethane layer adjacent said glass sheet is a thermoplastic polyurethane adhesive layer (1),
   and wherein the polyurethane layer (1) is adjacent the thermoplastic polyurethane layer (2).

* * * * *